April 14, 1931.  H. E. WARREN  1,801,129
PROGRAM INSTRUMENT
Filed April 18, 1930
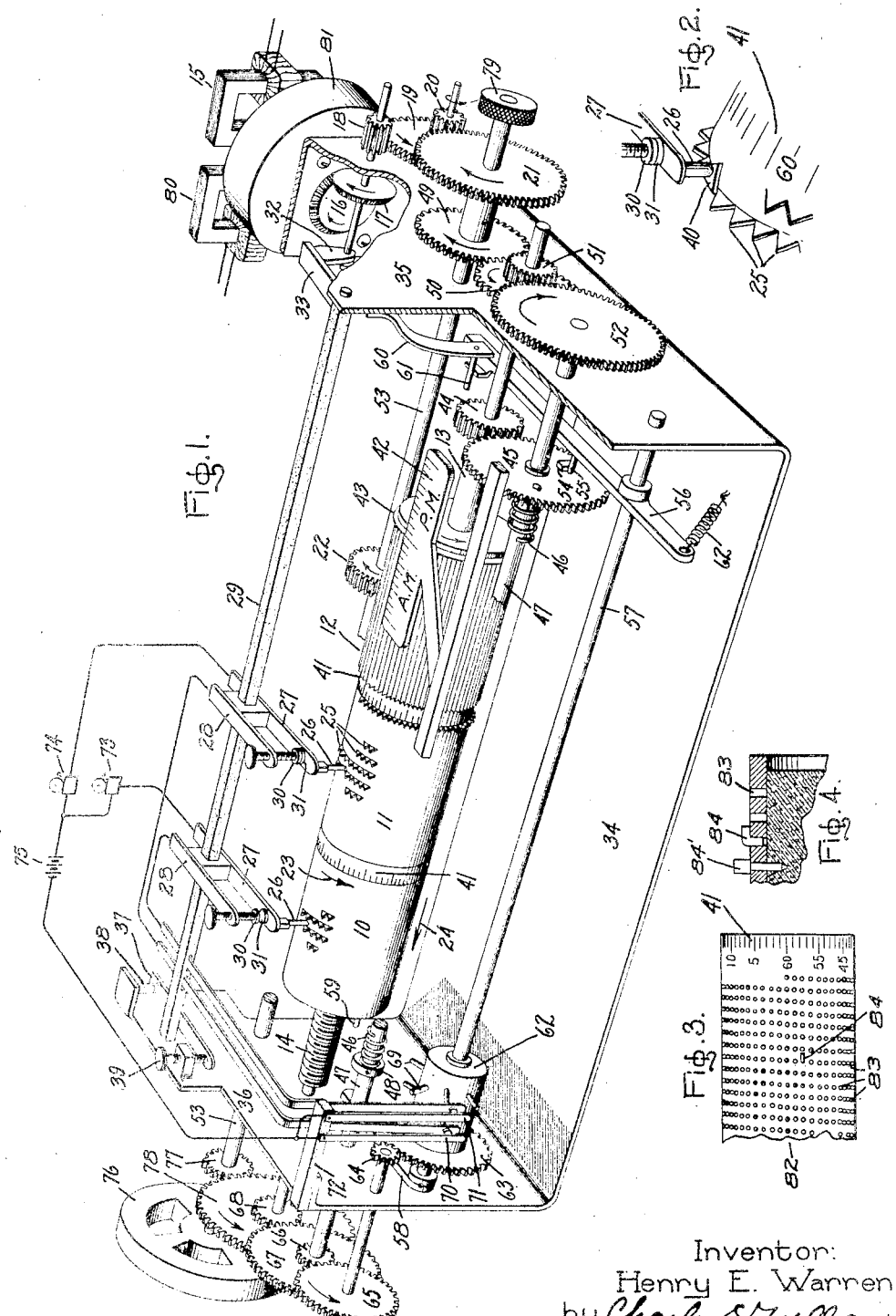
Inventor:
Henry E. Warren
by Charles E. Tullar
His Attorney.

Patented Apr. 14, 1931

1,801,129

UNITED STATES PATENT OFFICE

HENRY E. WARREN, OF ASHLAND, MASSACHUSETTS, ASSIGNOR TO WARREN TELECHRON COMPANY, OF ASHLAND, MASSACHUSETTS, A CORPORATION OF MAINE

PROGRAM INTRUMENT

Application filed April 18, 1930. Serial No. 445,476.

My invention relates to program instruments and its object is to provide structural and operating improvements in this type of apparatus.

A program instrument or machine forming the subject of my invention comprises apparatus for controlling one or more electric circuits at predetermined times of a day or week for the operation of electric signals, and controlling electrically actuated devices generally in a predetermined schedule. Such apparatus is often employed in schools, offices and factory buildings for ringing bells, operating relays, and in general closing and opening electric circuits for performing various scheduled operations according to some desired program. The program instrument is driven or actuated in response to a timing device so that the schedule is completed in a day or a week as desired and the circuit controlling device or devices of the instrument are capable of adjustment in such manner as to permit of altering the daily program as desired as well as to permit of altering the program for different days of the week.

In the particular program machine which I have chosen to represent my invention, each circuit to be controlled is provided with a two-circuit controller connected in series relation. One controller is actuated in accordance with any desired daily program and the other circuit controller is actuated in accordance with a weekly program such that if it is desired to omit the daily program on any particular day of the week the weekly program circuit controller keeps the circuit open on that particular day. The daily program controller may be set to close the circuit momentarily one or more times each day and the time or times of such closure may be set to the minute. This portion of the program instrument is automatically reset each 24 hours and the same schedule is repeated daily until the schedule is changed. Likewise the weekly program portion of the instrument completes its schedule once per week and automatically repeats its operation in accordance with its program setting.

Having thus outlined the general nature of the apparatus I will now refer to the accompanying drawing. Fig. 1 of the drawing represents a perspective view of a two-circuit program instrument incorporating the features of my invention; Fig. 2 is a detail view of the adjustable contact-making device used in the daily program drum of Fig. 1; Fig. 3 is another form of daily program drum that may be used in the apparatus of Fig. 1; and Fig. 4 is a detail view of a section of the drum of Fig. 3 showing how the contact setting is made.

The features of my invention which are believed to be new and patentable will be pointed out in the claims appended hereto.

The instrument represented in Fig. 1 has two daily program drums, 10 and 11, supported with the operating mechanism therefor in a suitable framework 34. It will be understood that an instrument may be provided with as many of these or equivalent drums as desired so as to provide a drum for each circuit to be controlled. The drums are mounted integral with a drum-shaped gear-wheel 12 on a shaft 13 which has screw threads 14 cut therein and which engage with corresponding threads cut in the inner surface of the drum structure so that as the drums are rotated they are moved lengthwise on shaft 13. The drums are normally rotated one revolution per hour by a timing device such as a synchronous motor 15 operating through gears 16, 17, 18, 19, 20, 21, 22 and 12, the normal direction of rotation of the drums being indicated by the arrow 23 and the normal direction of movement along the shaft 13 being in the direction of arrow 24.

The surface of each daily program drum is provided with facilities which may be made active or inactive for actuating a circuit controlling device and which in Fig. 1 comprise projecting teeth 25 arranged in a spiral row about the drum, the spiral or helix having the same pitch as the screw thread 14. It will be assumed that there are 24 turns to each spiral about each drum corresponding to the 24 hours in a day and 60 teeth in each spiral turn corresponding to the 60 minutes in an hour. Thus on the surface of each of the drums 10 and 11 there are 1440 teeth corresponding to the minutes of a day so arranged in a spiral that as a drum is rotated by the synchronous motor and is moved endwise along the shaft the 1440 teeth are moved past a given point in the course of a 24-hour day and at the rate of one tooth per minute. Such teeth may be formed by making the drum structure out of a suitable metal, cutting teeth therein as in manufacturing a gear-wheel, and then cutting a spiral groove in the toothed surface, leaving the spiral rows of thin upwardly projecting teeth therein. In the illustration only a few of the teeth have been shown but Fig. 2 gives a more detailed view of the general proportions of the teeth desirable for the purpose now to be explained. It will be understood that instead of having 60 equally spaced teeth in each turn I may have 12 equally spaced teeth per turn corresponding to every 5 minute period, or such other arrangement as is best suited for the purpose of the instrument. Adjacent each drum is a circuit controlling device comprising a contact operating finger 26 projecting downward from the end of a flat spring contact carrier 27 which is secured in spaced relation with a cooperating contact carrier 28. This contact device is mounted on a rock shaft 29. The parts 27 and 28 are of conducting material and are insulated from each other and carry relatively adjustable cooperating contacts 30 and 31 between their free ends. These contact devices are so positioned along the rock shaft 29 that a finger 26 is in alinement with the spiral groove between the teeth and adjacent the first tooth of the spiral at the far end of its program drum when the latter is in its initial position. The shaft is preferably rocked slightly once per minute to reciprocate the contact device towards and away from the drum by a cam 32 mounted on the shaft of gear wheel 17. Cam 32 raises a finger 33 secured to rock shaft 29 once per revolution of gear 17 and in modification described this occurs once per minute. The rock shaft is rotatably mounted in the end portions 35 and 36 of the framework 34 and to limit and adjust the extent of the rocking motion of shaft 29 I have provided an arm 37 secured thereto which cooperates at one end with a spring stop 38 and at the other end with an adjustable stop 39 secured to the end wall 36 of the framework. The contacts 30 and 31 are adjusted relative to each other so that normally they do not touch. When cam 32 rocks the shaft 29, finger 26 enters the spiral space between the rows of teeth and exactly opposite to an adjacent tooth but unless a tooth is bent over as best shown at 40 in Fig. 2 the contacts 30 and 31 are not closed. However, whenever it is desired to close the contacts 30 and 31, a tooth in the program drum is bent over into the path occupied by the contact device where it will serve as a stop for the finger 26 as it is rocked toward the drum. This causes the lower contact arm 27 to bend upward slightly to momentarily close the contacts, the duration of such closure (less than a minute) depending upon the length of the outer cam surface at 32. By properly adjusting the position of contact 30 and the stops 38 and 39 a quick positive make and break contact device is obtained. It will now be understood that by bending one or more teeth into the path of movement of finger 26 as represented at 40, Fig. 2, the contacts may be closed one or more times during a day for a short period of time, and that the time or times of such circuit closing operation may be timed to the minute by selecting the proper teeth. Assuming there are 60 teeth in each row of the spiral as previously described; the tooth which is bent over in Fig. 2 will cause the contacts to be closed at 11:03 p. m. assuming the finger 26 was positioned opposite 60 or the starting point of the spiral row of teeth at the opposite end of the drum at 12:00 midnight. The drums are preferably provided with a time graduated minute scale 41 about their periphery at one end as indicated and a stationary hour scale 42 is provided to indicate with the edge 43 of gear 12 the extent of lengthwise movement of the drums at all times. When the drums are reset to the initial position in the manner to be hereinafter explained, it will be understood that the indicating edge 43 will be opposite the graduation corresponding to 12 midnight at the right hand end of scale 42 and that the fingers 26 will be opposite the minute graduations 60 of scales 41 at the beginnings of the spiral or rows of teeth. It will be understood that the surface of the drums in which the teeth are formed will be made of a soft metal so that the teeth may be easily bent without breaking and that the daily program may be altered as desired by bending the desired teeth into or out of the path of finger 26. The time scales 41 and 42 will facilitate the quick selection of the teeth to be bent when changing the program. Once every 24 hours it will be necessary to reset the drum structure toward the end plate 35 and the apparatus for accomplishing this result will now be described.

The drum structure is reset by rapidly rotating the shaft 13 through gears 44 and 45 by means of energy storing means comprising a long spring 46 coiled about a shaft 47. One end of this spring is secured to gear 45 which is free to turn on shaft 47 and the other end of the spring is secured to shaft 47 by a collar 48. Gear 44 is secured to shaft 13. The shaft 47 and spring 46 are partially broken away to better expose the drum structure. The spring 46 is slowly wound up during the 24 hour period between resetting operations by the motor 15 operating through gears 16, 17, 18, 19, 20, 21, 49, 50, 51 and 52. Gear 49 is secured on the shaft 53 with gears 21 and 22. Gears 50 and 51 are fastened together but turn freely on an extension of shaft 13. Gear 52 is secured to shaft 47 and turns it together with the collar 48 and that end of spring 46 which is secured to the collar in the direction indicated by the arrow on gear 52. Thus the spring 46 is slowly wound up during the 24 hour period that the drum structure is moved toward the end plate 36. During this winding up period, gear 45 is held stationary by a stop 54 and a stop-pin 55. Lever 56 is normally held in the locking position shown against a stop-pin 61 in a resilient member 60, by means of a spring 62. Pin 55 projects from the lever 56 secured to shaft 57. At the opposite end of shaft 57 a lever 58 is secured thereto having its free end projecting in the path of a pin 59 in the end of the drum structure when the latter arrives adjacent lever 58 at the end of the 24 hour period. At the proper point in the 24th revolution of the drum structure, pin 59 rotates against lever 58 moving it downward. This turns shaft 57 and moves lever 56 downward releasing gear-wheel 45. As lever 56 is moved downward to release the gear 45 the lower free end of the resilient member 60 snaps over the lever 56 and holds it down to a position where stop 54 clears pin 55. This allows spring 46 to unwind, rapidly rotating gears 45, 44 and shaft 13 in a direction to cause the drum structure to be reset toward end plate 35. This is by reason of the fact that the threaded portion 14 is now rotating much faster than the drum structure is rotated in the same direction by gear 22. As the drum structure approaches its initial position its end moves against the end of pin 61 pressing resilient member 60 toward plate 35 and moving its lower end from over lever 56. At the proper instant lever 56 moves up and brings pin 55 into the path of stop 54 causing gears 45 and 44 to stop with the drum structure in its correct initial position. Such resetting operation requires 24 revolutions of shaft 13 and the parts are adjusted accordingly. Such resetting operation requires less than one minute. However, this causes no error in the slow turning movement of the drum since the drum structure is continuously driven through gears 12 and 22. It will be noted that gear drum 12 is of sufficient length to mesh with gear 22 regardless of the lengthwise movement of the drum structure.

The weekly program is represented at 62. It is rotatably mounted on shaft 57. Drum 62 is driven 1/7th of a revolution each 24 hours through gears 63, 64, 65, 66, 67 and 68 from shaft 13 when the latter is rotated in the resetting operation of the daily program drums. Gear 68 is secured to an extension of shaft 13. Gears 66 and 67 are secured together but rotate freely on shaft 47. The weekly program drum is provided with two rows of holes in which pins 69 may be inserted. There are seven of such holes equally spaced about the drum in each row corresponding to the seven days of the week. The two rows of pins cooperate with two double contact devices 70 and 71 mounted on an insulating arm 72. The seven normally stationary positions of drum 62 are such that when pins 69 are contained in all the holes such pins cooperate with the contact devices to keep them closed. If a pin opposite its contact device is removed the contact device remains open. Contact device 70 is connected in series with the contacts controlled by the daily program drum 11 and contact device 71 is connected in series with the contacts controlled by daily program drum 10. If now it is desired to omit the circuit closing program of either drums 10 or 11 or both on any particular day or days of the week the corresponding pin or pins 69 are removed from drum 62 so that although a particular circuit may be closed by the daily program drum it remains open at the contact device 70 or 71 as the case may be on the day or days selected.

I have represented electric bells 73 and 74 connected in circuit with the contacts controlled by the drums 10 and 11 respectively. The circuits include a source of supply 75 and the weekly program drum contacts as represented. It will be understood that bell 73 will be energized in accordance with the program selected on drum 10 and the corresponding portion of drum 62 by bending over selected teeth 25 in drum 10 and arranging the pins which actuate contacts 71. Similarly, bell 74 is controlled by drum 11 and the contacts 70. While I have represented the circuits as arranged to control bells it is to be understood that any other electrically actuated device or devices may be substituted in place of the bells.

A fly wheel 76 and an integral gear 77, free to turn on an extension of shaft 53, are rotated through a gear 78 from shaft 13 during the resetting operation to steady this operation. In order that the instrument may be easily set with respect to time and to facilitate testing and adjustment the driving gear train is arranged to be disconnected from the motor 15 by sliding gear 17 out of mesh with gear 16. Then a thumb nut 79 is provided on the end of shaft 53 whereby the driving gears of the instrument may be turned by hand when disconnected from the motor. A second driving motor is represented at 80 which may be provided for driving the instrument at several times normal speed after a failure in the source of supply until the instrument and timing system to which it is connected again indicates correct time. Such a system and resetting apparatus is described in my application Serial No. 249,175, filed January 24, 1928, electric clock system (which has now become Patent No. 1,768,431 issued June 24, 1930). The motors 15 and 80 are synchronous motors, preferably of the self-starting type. 81 represents a gear case containing suitable reduction gears between the motors and gear 16.

In Fig. 3, at 82 I have represented another form of program drum which may be used in place of the drums 10 and 11. The drum 82 is provided with a spiral row of holes 83 corresponding in number and position to the teeth in drum 10. A number of bent over pins 84 are provided so as to be inserted into selected holes to perform the same purpose as is accomplished by bending over the teeth in the form of drum shown in Fig. 1.

The form of pin shown at 84' may also be used. This is a straight pin with an enlarged head. The shank of the pin is of sufficient length to pass into an inner core of cork or other like material which grips the pin and holds it in place.

Fig. 4 shows a partial section of the form of drum shown in Fig. 3. The pins fit into the holes with sufficient tightness so as not to turn or drop out of place. The program may be changed by rearranging the pin or pins in the drum.

In accordance with the provisions of the patent statutes I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:

1. In a program instrument, a rotatably mounted drum, a screw shaft upon which said drum is threaded, a timing motor for rotating said drum on said shaft, such operation causing endwise movement of said drum with respect to said shaft by reason of the threaded relation, a normally open contact device adjacent the periphery of said drum, and a plurality of facilities on the surface of said drum which may be rendered active or inactive to momentarily close the normally open contact device as such facilities are rotated past said contact device, said facilities being arranged in a spiral about said drum, the spiral having the same pitch as the screw shaft thread whereby each of said facilities is brought adjacent the contact device as the drum is rotated and moved endwise.

2. In a program instrument, a rotatably mounted drum, a screw shaft upon which said drum is threaded, a timing motor for rotating said drum on said shaft, such operation producing endwise movement of said drum with respect to said shaft by reason of the threaded relation, a normally open contact device adjacent the periphery of said drum arranged to be reciprocated toward and away from said drum by the timing motor, the surface of said drum being provided with a plurality of stop holding facilities whereby stops may be positioned to momentarily cause the closure of said contact device when moved toward said drum, said facilities being arranged in a spiral row about said drum, the pitch of the spiral corresponding to the pitch of the screw shaft upon which the drum is threaded whereby each of the facilities is brought adjacent to said contact device as the drum is rotated and moved endwise, and a stop fitting any one of said facilities and adjustable from one facility to another.

3. In a program instrument, a rotatably mounted drum, a screw shaft upon which said drum is threaded, a timing motor for rotating said drum on said shaft, such operation causing endwise movement of said drum with respect to said shaft by reason of the threaded relation, a spiral row of teeth about said drum, the spiral having the same pitch as the thread on the screw shaft, a relatively stationary contact device positioned adjacent the spiral row of teeth on said drum, said teeth being bendable into the path occupied by said contact device to cause its operation when a bent-over tooth is moved past it.

4. In a program instrument, a rotatably mounted drum, said drum having a metallic surface with a peripheral row of teeth cut therein, a contact device positioned adjacent the row of teeth, a timing motor for rotating said drum to cause the teeth to move past the contact device, said teeth being bendable into the path occupied by said contact device to cause its operation when a bent-over tooth is moved past it.

5. A program instrument comprising a normally stationary screw shaft, a program drum threaded on said shaft and having an initial position with respect thereto, a timing motor for rotating said drum on said shaft at one revolution per hour, such operation causing the drum to move endwise from its initial position with respect to the shaft because of the threaded relation, a relatively stationary contact device positioned adjacent the periphery of said drum past which the drum is rotated and moved endwise by the timing motor, means selectively positioned on the surface of said drum for causing the actuation of said contact device at a predetermined time during a predetermined revolution of said drum from its initial position, and means responsive to a predetermined number of revolutions of the drum from its initial position for rapidly rotating said screw shaft to return said drum to its initial position.

6. A program instrument comprising a normally stationary screw shaft, a program drum threaded on said shaft and having an initial endwise position with respect thereto, a timing motor for slowly rotating said drum on said shaft, such operation causing the drum to move endwise with respect to said shaft from said initial position, a contact device positioned adjacent the periphery of said drum past which the drum is rotated and moved endwise by the timing motor, means selectively positioned on the surface of the drum for causing the actuation of said contact device at a predetermined time when said means is moved past such device, a spring wound up by the timing motor during the aforesaid operation of said drum, means responsive to a predetermined endwise movement of said drum for releasing said spring, and means connected between said spring and screw shaft for rapidly rotating the latter to reset said drum to its initial endwise position.

7. A program instrument comprising a normally stationary screw shaft, a program drum threaded on said shaft and having an initial endwise position with respect thereto, a timing motor for slowly rotating said drum on said shaft, such operation causing the drum to move endwise from its initial position because of the threaded relation, a contact device positioned adjacent the periphery of said drum past which the drum is rotated and moved endwise by the timing motor, means selectively positioned on the surface of said drum for causing the actuation of said contact device at a predetermined time, the time of operation being determined by the peripheral and endwise position of said means on the drum, means for storing energy from the timing motor during the aforesaid operation, means responsive to a predetermined number of revolutions of said drum with respect to said screw shaft for releasing such stored energy, and means actuated by such released energy for rapidly rotating said screw shaft to return said drum to its initial position.

8. A program instrument comprising a screw shaft, a spring for rotating said shaft, means normally locking said shaft against rotation, a program drum threaded on said shaft and having an initial endwise position with respect thereto, a timing motor for slowly rotating said drum on said shaft and winding up said spring, an electric circuit controller operated at a predetermined selected time by the movement of said drum, means responsive to a predetermined number of revolutions of said drum from its initial position for releasing said locking means and allowing the rapid rotation of said screw shaft to return the drum to its initial position, and means responsive to the return of said drum to its initial position for again locking said shaft against rotation.

9. A program instrument comprising a screw shaft, energy storing means for rotating said shaft, means normally locking said shaft against rotation, a daily program drum threaded on said shaft and having an initial endwise position with respect thereto, a timing motor for slowly rotating said drum and storing energy in the energy storing means, an electric circuit controller operated at a predetermined selected time of day by the movement of said drum, means responsive to a predetermined number of revolutions of said drum from its initial position for releasing said locking means and allowing the energy storing means to rapidly rotate said screw shaft to return the drum to its initial position, a weekly program drum and means whereby the weekly program drum is rotated a predetermined amount when said screw shaft is rotated to restore the daily program drum to its initial position.

10. A program instrument comprising daily and weekly program circuit controlling devices, a series connected circuit controlled thereby in accordance with a daily and weekly schedule, a timing motor for continuously operating the daily program circuit controlling device, energy storing means receiving energy from said timing motor, automatic means responsive to the operation of said daily program circuit controlling device for causing it to be reset to an initial position once per day by energy from the energy storing means, and means responsive to said resetting operation for operating the weekly program circuit controlling device.

In witness whereof, I have hereunto set my hand this 16th day of April, 1930.

HENRY E. WARREN.